US008503663B2

(12) United States Patent
Mewhinney et al.

(10) Patent No.: US 8,503,663 B2
(45) Date of Patent: Aug. 6, 2013

(54) SYSTEM AND METHOD FOR AGENT QUEUE ACTIVATION IN A CONTACT CENTER

(75) Inventors: Brian Edward Mewhinney, Carmel, IN (US); Matthew Alan Taylor, Brownsburg, IN (US); Jay Michael Langsford, Indianapolis, IN (US); Donald E. Brown, Zionsville, IN (US)

(73) Assignee: Interactive Intelligence, Inc., Indianapolis, IN (US)

( * ) Notice: Subject to any disclaimer, the term of this patent is extended or adjusted under 35 U.S.C. 154(b) by 1037 days.

(21) Appl. No.: 11/427,972

(22) Filed: Jun. 30, 2006

(65) Prior Publication Data

US 2007/0002744 A1    Jan. 4, 2007

Related U.S. Application Data

(60) Provisional application No. 60/695,750, filed on Jun. 30, 2005.

(51) Int. Cl.
*H04M 3/00* (2006.01)
*H04M 5/00* (2006.01)

(52) U.S. Cl.
USPC ............ 379/265.05; 379/265.01; 379/265.02; 379/266.02

(58) Field of Classification Search
USPC .............. 379/265.1, 265.11, 265.12, 265.01, 379/266.01, 266.02, 266.08, 265.09, 265.13, 379/265.02, 265.03, 265.04, 265.05, 265.06, 379/265.07, 265.08, 265.14, 266.03, 266.04, 379/266.05, 266.06, 266.07, 266.09, 266.1
See application file for complete search history.

(56) References Cited

U.S. PATENT DOCUMENTS

| | | | |
|---|---|---|---|
| 5,185,780 A * | 2/1993 | Leggett | 379/265.08 |
| 5,325,292 A * | 6/1994 | Crockett | 705/7.18 |
| 5,499,291 A * | 3/1996 | Kepley | 379/265.06 |
| 5,721,770 A * | 2/1998 | Kohler | 379/265.12 |
| 5,903,641 A | 5/1999 | Tonisson | |
| 5,926,539 A | 7/1999 | Shtivelman | |
| 5,933,492 A | 8/1999 | Turovski | |
| 5,946,375 A | 8/1999 | Pattison et al. | |
| 6,044,355 A | 3/2000 | Crockett et al. | |
| 6,055,308 A | 4/2000 | Miloslavsky et al. | |
| 6,058,163 A | 5/2000 | Pattison et al. | |
| 6,188,673 B1 * | 2/2001 | Bauer et al. | 370/252 |
| 6,263,049 B1 | 7/2001 | Kuhn | |
| 6,278,978 B1 | 8/2001 | Andre et al. | |
| 6,314,177 B1 * | 11/2001 | Davis et al. | 379/265.12 |
| 6,353,667 B1 * | 3/2002 | Foster et al. | 379/265.05 |
| 6,356,632 B1 | 3/2002 | Foster et al. | |
| 6,381,640 B1 | 4/2002 | Beck et al. | |
| 6,453,038 B1 | 9/2002 | McFarlane et al. | |

(Continued)

FOREIGN PATENT DOCUMENTS

WO    WO 01/61594 A2    8/2001

*Primary Examiner* — Khai N Nguyen (57) ABSTRACT

Various technologies and techniques are disclosed for automating the activation of agents in particular workgroups. A call queue server receives incoming communications. A scheduling server is coupled to the call center server over a network and analyzes historical communication data to calculate a forecasted load for a particular time period. The system uses the forecasted load to create agent schedules for the workgroups for the particular time period. The system programmatically activates and deactivates the agents into and out of the workgroups at scheduled points in time based on the calculated schedules. The call center server routes each of the queued communications to a particular agent that is activated on a particular one of the workgroup.

38 Claims, 3 Drawing Sheets

U.S. PATENT DOCUMENTS

| | | |
|---|---|---|
| 6,493,446 B1 | 12/2002 | Cherry |
| 6,512,825 B1 | 1/2003 | Lindholm et al. |
| 6,563,920 B1 * | 5/2003 | Flockhart et al. ........... 379/265.1 |
| 6,614,902 B1 * | 9/2003 | Rizzetto ................... 379/265.11 |
| 6,665,395 B1 | 12/2003 | Busey et al. |
| 6,704,410 B1 * | 3/2004 | McFarlane et al. ...... 379/265.05 |
| 6,707,903 B2 | 3/2004 | Burok et al. |
| 6,744,878 B1 | 6/2004 | Komissarchik et al. |
| 6,754,331 B2 | 6/2004 | McCormack |
| 6,771,764 B1 * | 8/2004 | Dezonno ................... 379/265.02 |
| 6,850,613 B2 | 2/2005 | McPartlan et al. |
| 6,859,529 B2 | 2/2005 | Duncan et al. |
| 6,922,689 B2 | 7/2005 | Shtivelman |
| 6,956,941 B1 | 10/2005 | Duncan et al. |
| 6,970,829 B1 * | 11/2005 | Leamon ....................... 705/7.14 |
| 2001/0012356 A1 | 8/2001 | McDuff et al. |
| 2001/0014143 A1 | 8/2001 | Kuhn |
| 2002/0114442 A1 | 8/2002 | Lieberman et al. |
| 2003/0009520 A1 | 1/2003 | Nourbakhsh et al. |
| 2003/0099343 A1 * | 5/2003 | Dezonno ................... 379/265.11 |
| 2003/0152212 A1 | 8/2003 | Burok et al. |
| 2004/0057416 A1 | 3/2004 | McCormack |
| 2005/0135601 A1 * | 6/2005 | Whitman, Jr. ............ 379/266.08 |
| 2006/0029206 A1 | 2/2006 | Anisimov et al. |
| 2006/0062376 A1 * | 3/2006 | Pickford ................... 379/265.12 |
| 2006/0182259 A1 * | 8/2006 | Shaffer et al. ............ 379/265.02 |
| 2007/0003050 A1 * | 1/2007 | Ebling et al. ............. 379/265.02 |

* cited by examiner

SYSTEM AND METHOD FOR AGENT QUEUE ACTIVATION IN A CONTACT CENTER

CROSS-REFERENCE TO RELATED APPLICATIONS

This application claims the benefit of U.S. Provisional Patent Application Ser. No. 60/695,750 filed Jun. 30, 2005.

FIELD OF THE INVENTION

The present invention generally relates to telecommunication systems and methods, as well as systems for distributing communications within a contact center. More particularly, the present invention pertains to a system and method for automatically activating agents within the communication handling queues of a contact center.

BACKGROUND

Communications handling centers, such as call centers, are well known in the art. Telephone call centers, for example, are often used as telemarketing sales centers, customer service or support providers, or to otherwise automatically distribute received calls. In recent years focus has been on improving call center efficiency by maximizing the number of calls an agent can handle as well as minimizing the duration of calls. As a result, the business processes and capabilities of call centers have evolved and been substantially improved through the use of technology. For example, call centers are now able to handle communications in a variety of different media formats such as web chats, faxes, and/or other work objects turning them into full fledged contact centers.

Additionally, while contact centers once were provided by operators such as local utility companies or small mail order providers, they are now being employed by some of the largest and most diversified entities in the world. For example, world-wide credit card companies, banks, major energy providers, and retailers are some of the large and often diversified operators of complex contact centers.

In response to this growth in functionality, contact center agents have had to expand their skill sets from traditional telephone communications into a variety of other contact points in order to provide service across all available platforms. Additionally, with the growing scope complexity of the services provided by the contact center, each communication has a number of handling requirements, depending on, for example, the nature of the call, the originating area, and even the language of the call. However, since every agent cannot be trained to handle all of the various communications that a call center may receive, individual agents are often only able to handle one or more designated types of communications. For example, agents are typically trained to process communications related to a certain subject matter, such as sales, support, and/or in certain languages.

The success of a contact center relies on enabling the right people to handle the right communication load at the right time. Currently, a contact center supervisor or other person must manually move agents into and out of workgroups through the day at specific times to assure availability of resources at the right times and in the right places. This process is tedious and difficult to manage, and thereby prone to error.

SUMMARY

Various technologies and techniques are disclosed for automating the activation of agents in particular workgroups. In one embodiment, a call queue server receives incoming communications. A scheduling server is coupled to the call center server over a network and analyzes historical communication data to calculate a forecasted load for a particular time period. The system uses the forecasted load to create agent schedules for the workgroups for the particular time period. The system programmatically activates and deactivates the agents into and out of the workgroups at scheduled points in time based on the calculated schedules. The call center server routes each of the queued communications to a particular agent that is activated on a particular one of the workgroups.

This summary is provided to introduce a selection of concepts in a simplified form that are described in further detail in the detailed description and drawings contained herein. This Summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The preferred embodiment of the invention will be described in the context of a telephony call center interconnected with the public switched telephone network (the "PSTN"). A person of skill in the art will appreciate that the invention may be used in analogous communications handling centers. For example, the invention may be used as part of a Voice-over-Internet-Protocol ("VoIP") call center server connected with a packet switched data network; as part of an e-mail response center, a facsimile center, a web enabled response center; or the like.

Figure 1:
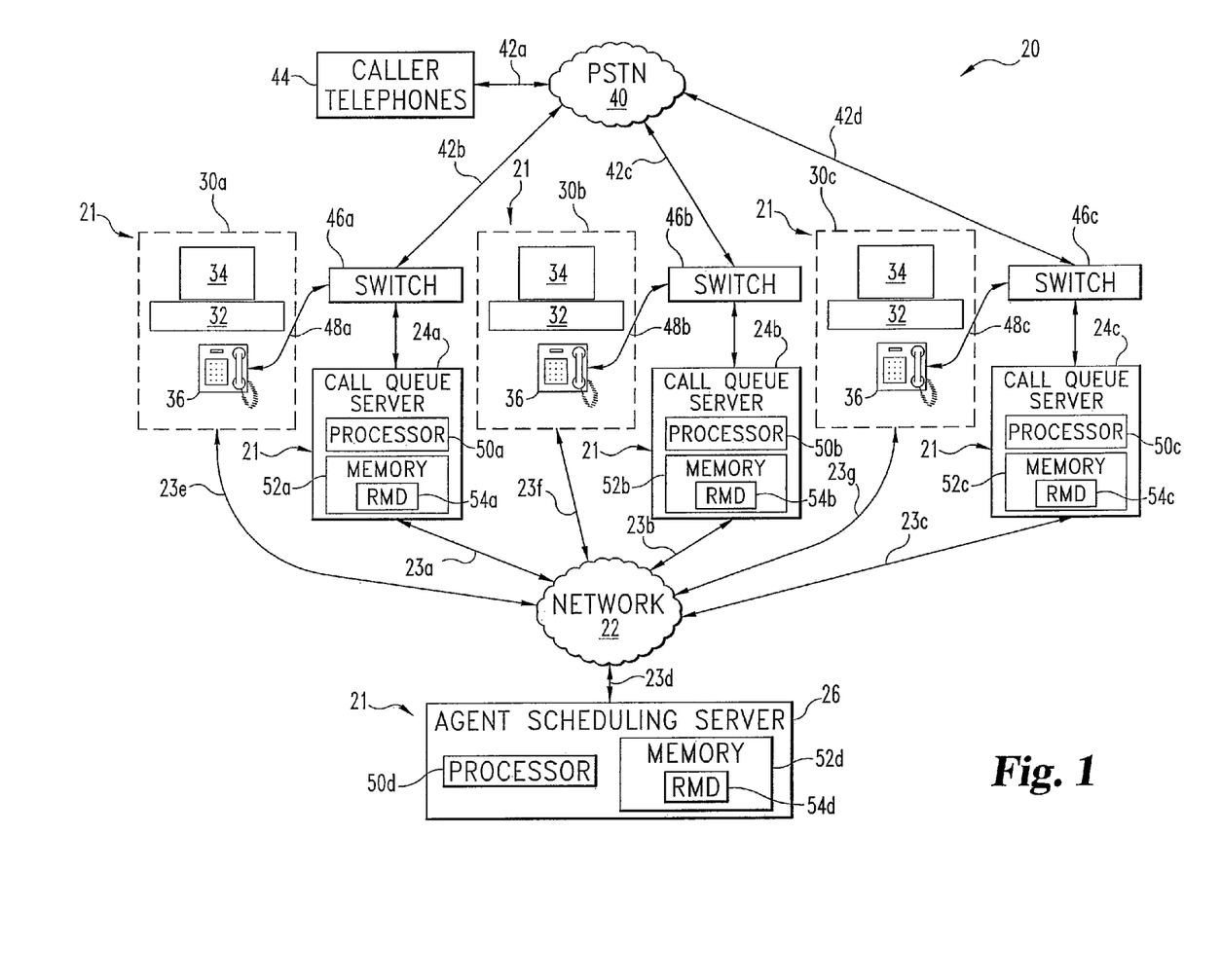
FIG. 1 is a diagrammatic view of a computer system of one implementation.

One implementation includes a unique system for activating and deactivating agents in a call center. FIG. 1 is a diagrammatic view of computer system 20 of one embodiment of the present invention. Computer system 20 includes computer network 22. Computer network 22 couples together a number of computers 21 over network pathways 23. More specifically, system 20 includes several servers, namely Call Queue Servers 24a, 24b, and 24c, and an Agent Scheduling Server 26. System 20 also includes agent client workstations 30a, 30b, and 30c. While computers 21 are each illustrated as being a server or client, it should be understood that any of computers 21 may be arranged to include both a client and server. Furthermore, it should be understood that while seven computers 21 are illustrated, more or fewer may be utilized in alternative embodiments.

Call Queue Servers 24a, 24b, and 24c and Agent Scheduling Server 26 include one or more processors or CPUs (50a, 50b, 50c, and 50d, respectively) and one or more types of memory (52a, 52b, 52c, and 52d, respectively). Each memory 52a, 52b, 52c, and 52d includes a removable memory device (54a, 54b, 54c, and 54d, respectively). Although not shown to preserve clarity, each computer 21 of system 20 includes one or more processors or CPUs and one or more types of memory. Each processor may be comprised of one or more components configured as a single unit. Alternatively, when of a multi-component form, a processor may have one or more components located remotely relative to the others. One or more components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

System 20 further illustrates Public Switched Telephone Network (PSTN) 40 coupled to computer-controlled telephone switches 46a, 46b, and 46c (alternatively designated switches 46) of servers 24a, 24b, and 24c by pathways 42b, 42c, and 42d, respectively. Caller telephones 44 are coupled to PSTN 40 by pathway 42a. Switches 46 are also coupled to telephones 48a, 48b, and 48c (alternatively designated telephones 48). For the sake of clarity, each switch 46 is shown coupled to a corresponding telephone 48. However, is should be understood that each of telephones 48 may be coupled to one or more switches and that switches 48 may be located at one or more physical locations. Switches 46 may be arranged in the form of a Private Branch Exchange (PBX), predictive dialer, Automatic Call Distributor (ACD), a combination of these, or another switching configuration as would occur to those skilled in the art. Telephones 48 may be in the form of a handset, headset, or other arrangement as would occur to those skilled in the art. Telephones 48a, 48b, and 48c are each associated with a different one of agent workstations 30a, 30b, and 30c, respectively (collectively designated agent workstations 30). Agent workstations 30 each include an agent computer 32 coupled to a display 34. Agent computers 32 may be of the same type, or a heterogeneous combination of different computing devices. Likewise, displays 34 may be of the same type, or a heterogeneous combination of different visual devices. Although not shown to preserve clarity, each agent workstation 30 may also include one or more operator input devices such as a keyboard, mouse, track ball, light pen, and/or microtelecommunicator, to name just a few representative examples. Also, besides display 34, one or more other output devices may be included such as loudspeaker(s) and/or a printer.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22. It should also be recognized that computer network 22 may include one or more elements of PSTN 40. Indeed, in an alternate embodiment, PSTN 40 and computer network 22 are provided as a common network.

In one embodiment, system 20 operates as a call center at one or more physical locations that are remote from one another with call queue servers 24a, 24b, and 24c being configured as call center server hosts, agent scheduling server 26 being configured as a server for activating and deactivating agents from workgroups, and agent workstations 30a, 30b, and 30c each arranged as a call center client host. Additional telephones 48 may be connected to switches 46 that each correspond to an additional client host to provide more agent workstations 30 (not shown). Typically call center applications of system 20 would include many more agent workstations of this type at one or more physical locations, but only a few have been illustrated in FIG. 1 to preserve clarity. Also, one or more servers 24 may be configured as a call center server host at one or more physical locations.

Alternatively or additionally, system 20 may be arranged to provide for distribution and routing of a number of different forms of communication, such as telephone calls, voice mails, faxes, e-mail, web chats, web call backs, and the like. Furthermore, business/customer data associated with various communications may be selectively accessed with system 20. This data may be presented to an agent at each agent workstation 30 by way of monitor 34 operatively coupled to the corresponding agent computer 32.

Figure 2:
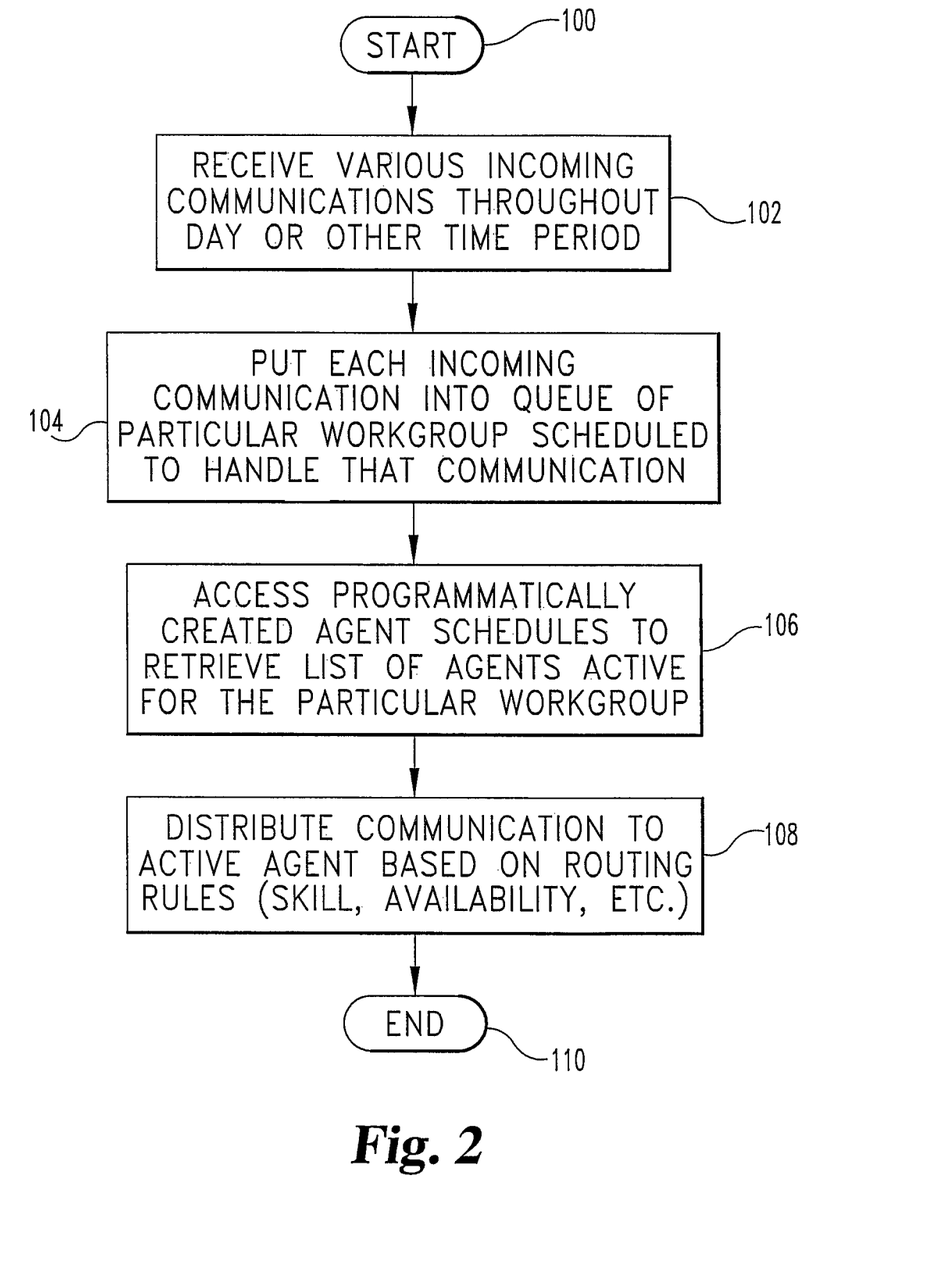
FIG. 2 is a process flow diagram for the system of FIG. 1 demonstrating the stages involved in receiving and routing communications to automatically activated agents.
Figure 3:
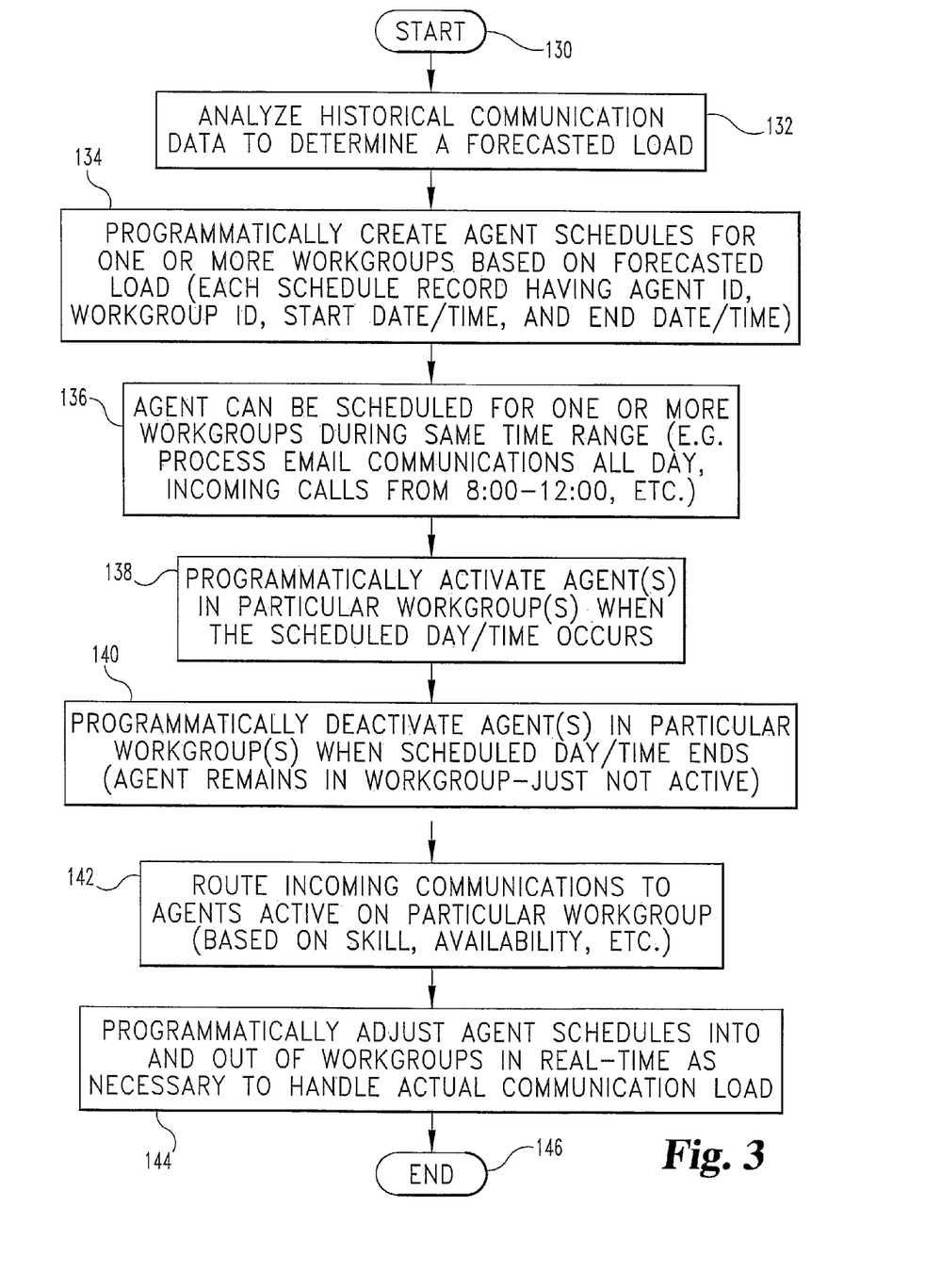
FIG. 3 is a process flow diagram for the system of FIG. 1 demonstrating the stages involved in activating agents into and out of workgroups at particular times.

Turning now to FIGS. 2-3 with continued reference to FIGS. 1-2, the stages for implementing one or more aspects of system 20 are described in further detail. FIG. 2 is a high level process flow diagram that demonstrates a process for routing incoming communications based on programmatically generated agent workgroup schedules. In one form, the process of FIG. 2 is at least partially implemented in the operating logic of system 20. The process begins at start point 100 with receiving various incoming communications throughout the day or other time period (stage 102). Each incoming communication is placed into the queue of a particular workgroup that is scheduled to handle that communication (stage 104). Agent scheduling server 26 accesses programmatically created agent schedules to retrieve a list of agents which are active for the particular workgroup (stage 106). Call queue server 24 distributes the communication to an active agent based on routing rules (skill, availability, etc.) (stage 108). The process then ends at end point 110.

FIG. 3 illustrates the stages involved in activating and deactivating agents from particular workgroups programmatically. In one form, the process of FIG. 3 is at least partially implemented in the operating logic of system 20. The process begins at start point 130 with analyzing historical communication data to determine a forecasted load (stage 132). Agent scheduling server 26 programmatically creates agent schedules for one or more workgroups based on a forecasted load (stage 134). In one implementation, each schedule record has an agent ID, workgroup ID, start date/time, end date/time, and other routing rules known to one of skill in the art including agent skills, system desire to use agent, etc. The agent can be scheduled for one or more workgroups during the same time range (e.g. process email communications all day, and incoming calls from 8:00-12:00, etc.) (stage 136). Agent scheduling server 26 programmatically activates one or more agents in the particular workgroups when the scheduled day/time occurs (stage 138). Agent scheduling server 26 programmatically deactivates the agents in particular workgroups when the scheduled day/time ends (stage 140). When the agent is deactivated from the workgroup, he/she is still a member of the workgroup, but just in a deactivated status. Call queue server 30 routes the incoming communications to agents active on a particular workgroup (based on skill, availability, etc.) (stage 142). Agent scheduling server 26 programmatically adjust the agents schedules into and out of the workgroups in real-time as necessary to handle an actual communication load (stage 144). The process then ends at end point 146.

In one embodiment, a method is disclosed that comprises: analyzing a plurality of historical communication data to calculate a forecasted load for a particular schedule period. The forecasted load is used to create a plurality of agent schedules for a plurality of workgroups for the particular schedule period. The plurality of agents are programmatically activated and deactivated into and out of the plurality of workgroups at scheduled points in time based on the calculated schedules.

In another embodiment, a computer-readable medium having computer-executable instructions is disclosed that comprises logic for: receiving at least one incoming communication during a particular time period. The incoming communication is placed into a queue of a particular workgroup scheduled to handle the communication. A plurality of programmatically created agent schedules is accessed to retrieve a list of one or more agents active for the particular workgroup. The communication is distributed to an agent on the list based on one or more routing rules.

In yet a further embodiment, a system is disclosed that comprises: at least one call center server, the call center server including means for queuing communications. A scheduling server is coupled to the call center server over a network, the scheduling server including a means for analyzing a plurality of historical communication data to calculate a forecasted load for a particular time period, means for using the forecasted load to create a plurality of agent schedules for a plurality of workgroups for the particular time period, and means for programmatically activating and deactivating the plurality of agents into and out of the plurality of workgroups at scheduled points in time based on the calculated schedules. The call center server includes a means for routing each of the queued communications to a particular agent of the plurality of agents that is activated on a particular workgroup of the plurality of workgroups.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

What is claimed is:

1. A method of using a computer, which is configured in one of a single unit form and a multi-component form, for routing a first communication and a second communication via a network, comprising:
   (a) analyzing, by the computer, a plurality of historical communication data to calculate a forecasted load for a particular schedule period;
   (b) assigning an agent to a grouping of one or more agents such that the grouping includes at least two agents according to said forecasted load;
   (c) assigning the agent to an other grouping of one or more agents such that the other grouping includes at least two agents according to said forecasted load;
   (d) activating the agent with respect to the grouping during a time range;
   (e) activating the agent with respect to the other grouping during an other time range, wherein there is an overlapping time range where the time range and the other time range overlap;
   (f) adjusting, by the computer, the schedule of the agent into and out of the grouping in real-time based on an actual communication load;
   (g) receiving a first communication via the network;
   (h) receiving a second communication via the network;
   (i) routing, by the computer, the first communication to the agent via the network; and,
   (j) routing, by the computer, the second communication to the agent via the network.

2. The method of claim 1 further including a non-transitory computer-readable medium comprising instructions executed by a processor for allowing the computer to perform at least some of the steps recited in claim 1 that at least include at least partially performing steps (c) and (d); and,
   wherein one of the two groupings is capable of being related to a queue such that, if the queue were related to the one of the two groupings, the agent would be capable of relating to the queue through the one of the two groupings.

3. The method of claim 2 wherein the first communication is a work object and the second communication is a work object; and,
   wherein one of the two groupings is related to a queue such that the agent is capable of relating to the queue through the one of the two groupings.

4. The method of claim 3 wherein the routing of the first communication to the agent occurs by routing the first communication to the grouping and not by routing the first communication to the other grouping;
   wherein the routing of the second communication to the agent occurs by routing the second communication to the other grouping and not by routing the second communication to the grouping; and,
   wherein the routing of the first communication to the agent and the routing of the second communication to the agent occur during the overlapping time range.

5. The method of claim 4 wherein at least five of the following six steps are at least partially performed: steps (a), (b), (c), (d), (h), and (i).

6. The method of claim 5 wherein the two workgroups are each respectively related to a queue such that the agent is capable of relating to the queue through each of the two workgroups.

7. The method of claim 4 wherein at least one of the following two steps are at least partially performed: steps (c) and (d).

8. The method of claim 7, wherein the grouping is associated with a media format;
wherein the first communication is of the media format; and,
wherein the routing of first communication to the grouping relates to the fact that the grouping is of the media format and the first communication is of the media format.

9. The method of claim 8 wherein the other grouping is associated with an other media format, and wherein the not routing of the first communication to the other grouping relates to the fact that the other grouping is of the other media format and the first communication is of the media format.

10. The method of claim 7 wherein the other grouping is associated with an other media format;
wherein the second communication is of the other media format; and,
wherein the routing of second communication to the other grouping relates to the fact that the other grouping is of the other media format and the second communication is of the other media format.

11. The method of claim 7 wherein the grouping of agents is not associated with a particular media format, wherein the first communication is not of the particular media format, and wherein the routing of the first communication to the grouping relates to the fact that grouping is not associated with the particular media format and the first communication is also not of the particular media format.

12. The method of claim 11 wherein the other grouping of agents is not associated with an other particular media format, and wherein the not routing the first communication to the other grouping relates to the fact that the other grouping is not associated with the other particular media format.

13. The method of claim 12 wherein the grouping is associated with the other particular media format, wherein the first communication of the other particular format, and wherein the routing of the first communication to the grouping further relates to the fact that the grouping is associated with the other particular media format and the first communication is of the other particular format.

14. The method of claim 13 wherein the other grouping is associated with the particular media format, and wherein the not routing of the first communication to the other grouping further relates to the fact that the other grouping is associated with the particular media format.

15. The method of claim 11 wherein the other grouping is not associated with an other particular media format, and wherein the second communication is not of the other particular media format, and wherein the routing of the second communication to the other grouping relates to the fact that the other grouping is not associated with the other particular media format and the second communication is also not of the particular media format.

16. The method of claim 15 wherein the particular media format and other particular media format are each respectively associated with an at least partially different respective subset of the following formats: a voice call related format, a chat related format, an email related format, and a fax related format.

17. The method of claim 15 wherein the particular media format and other particular media format are each respectively associated with a respective subset of the following formats: a voice call related format, a chat related format, an email related format, and a fax related format; and,
wherein each of the two respective subsets are mutually exclusive with respect to each other.

18. The method of claim 7 further including: relating the grouping to a queue; relating the other grouping to another queue.

19. The method of claim 7 further including: relating at least one of the groupings to a queue.

20. The method of claim 7 wherein the computer is a call queue server.

21. The method of claim 4 further including:
implementing the deactivation capability of the computer to at least one of the following:
programmatically deactivate the agent with respect to the grouping at an end of the time range, and programmatically deactivate the agent with respect to the other grouping at an end of the other time range.

22. The method of claim 4 further including:
implementing the deactivation capability of the computer to at least one of the following:
programmatically deactivate the agent with respect to the grouping at a time within the time range, and programmatically deactivate the agent with respect to the other grouping at a time within the other time range.

23. The method of claim 4 further including at least one of the following: programmatically activating the agent with respect to the grouping at a time that is not within the time range, and programmatically activating the agent with respect to the other grouping at a time that is not within the other time range.

24. The method of claim 4 further including at least one of (a) and (b):
(a) implementing the deactivation capability of the computer to programmatically deactivate the agent with respect to the grouping; and afterwards, programmatically activating the agent with respect to the grouping at a time that is not within the time range; and
(b) implementing the deactivation capability of the computer to programmatically deactivate the agent with respect to the other grouping; and afterwards, programmatically activating the agent with respect to the other grouping at a time that is not within the other time range.

25. The method of claim 3 further including:
implementing the deactivation capability of the computer to programmatically deactivate the agent with respect to the other grouping such that the agent remains assigned to the other grouping but is incapable of receiving via the other grouping at least one of: the first communication and the second communication;
wherein the agent remains activated in the grouping, for a portion of time in the time range that occurs after the programmatic deactivation of the other agent such that the agent remains able to receive at least one of the two communications via the grouping during the portion of time;
wherein the routing of both of the two communications occur during the portion of time; and,
wherein at least one of the following two steps: (c) and (d) are at least partially performed.

26. The method of claim 3 further including: implementing the deactivation capability of the computer to programmatically deactivate the agent with respect to the other grouping such that the agent remains assigned to the other grouping but is incapable of receiving via the other grouping both the first communication and the second communication;
wherein the agent remains activated in the grouping, for a portion of time in the time range that occurs after the programmatic deactivation of the other agent such that the agent remains able to receive both of the two communications via the grouping during the portion of time;
wherein the routing of both of the two communications occurs during the portion of time and the routing of both of the two communications to the agent are via the grouping and not via the other grouping because the agent is activated during the portion of time with respect to the grouping and deactivated with respect to the other grouping; and,
wherein at least one of the following two steps (c) and (d) are at least partially performed.

27. The method of claim 26 wherein the grouping is associated with a media type and not associated with an other media type; and,
wherein the routing of both of the two communications to the agent via the grouping further relates to the fact that the grouping is associated with the media type and not associated with the other media type.

28. The method of claim 1 wherein at least three of the following four steps are at least partially performed programmatically: steps (c), (d), (h), and (i).

29. The method of claim 28 wherein each of the groupings is a workgroup.

30. The method of claim 28 wherein all of the agents in the grouping have a skill in common; and,
wherein all of the agents in the other grouping have an other skill in common.

31. The method of claim 1, wherein the computer in at least one of steps (c) and (d) deactivates the agent with respect to said grouping but leaves said agent assigned to the grouping.

32. A method of scheduling agents, performed by a processor, the method comprising:
assigning an agent to a workgroup of agents;
assigning the agent to an other workgroup of agents;
programmatically scheduling, by the processor, the workgroup of agents based on a forecast load;
wherein the programmatic scheduling of the workgroup of agents includes programmatically scheduling, by the processor, the agent to be activated during a time range;
wherein the programmatic scheduling of the workgroup of agents includes programmatically scheduling, by the processor, the agent to be deactivated at a time when the time range ends;
programmatically scheduling, by the processor, the other workgroup of agents;
wherein the programmatic scheduling of the other workgroup of agents includes programmatically scheduling, by the processor, the agent to be activated during an other time range, wherein the other time range at least partially overlaps the time range;
wherein the programmatic scheduling of the other workgroup of agents includes programmatically scheduling, by the processor, the agent to be deactivated at a time when the other time range ends;
programmatically activating, by the processor, the agent with respect to the workgroup for the time range;
programmatically activating, by the processor, the agent with respect to the other workgroup for the other time range;
programmatically deactivating, by the processor, the agent with respect to the workgroup at the time when the time range ends;
programmatically deactivating, by the processor, the agent with respect to the other workgroup at the time when the other time range ends; and adjusting, by the processor, the schedule of the agent into and out of the workgroup in real-time based on an actual communication load.

33. The method of claim 32 wherein one of the two workgroups is related to a queue such that the agent is capable of relating to the queue through the one of the two workgroups.

34. The method of claim 33 further including:
programmatically rescheduling the workgroup of agents, wherein the programmatic rescheduling includes programmatically rescheduling the agent to be programmatically deactivated with respect to the workgroup of agents at a time before the time when the time range ends; and,
programmatically deactivating the agent with respect to the workgroup at the time before the time when the time range ends.

35. A method of employing a computer for routing communications to grouped agents via a network, comprising:
identifying a first group of agents, wherein the first group is associated with a first communication type and not associated with a second communication type;
identifying a second group of agents, wherein the second group is associated with the second communication type and not associated with the first communication type;
assigning an agent to the first group;
assigning an other agent to the second group;
receiving a first communication via the network that is of the first communication type and not of the second communication type;
routing the first communication via the network to the agent assigned to the first group because: (i) the first communication is of the first communication type, (ii) because the first communication is not of the second communication type, (iii) the first group is associated with the first communication type, and (iv) the first group is not associated with the second communication type;
receiving a second incoming communication via the network that is of the second communication type and not of the first communications type;
routing the second communication via the network to the other agent assigned to the second group because: (i) the second communication is of the second communication type, (ii) the second communication is not of the first communications type, (iii) the second group is associated with the second communication type, and (iv) the second group is not associated with the first communication type; and
adjusting, by the computer, a schedule of the agent into and out of the first group and the second group in real-time based on an actual communication load.

36. The method of claim 35 further including: a non-transitory computer-readable medium comprising instructions performed by a processor for performing at least most of the recited steps; and,
wherein one of the two groups is related a queue such that the agent is capable of relating to the queue through the one of the two groups.

37. The method of claim 36 further including:
(a) assigning the agent also to the second group;
(b) activating the agent with respect to each of the two groups;
(c) activating the other agent to the second group;
(d) deactivating the other agent with respect to the second group such that the second communication may not be routed to the other agent while the other agent remains deactivated with respect to the second group;

(e) instead of routing the second communication to the other agent, routing the second communication via the network to the activated agent assigned to the second group because the agent is activated in the second group, the second communication is of the second communication type, the second communication is not of the first communications type, the second workgroup is associated with the second communication type, and the second group is not associated with the first communication type;

wherein the first communication may be routed to the agent while the agent remains activated in the first group; and, wherein at least two of steps (b), (c), and (d) are performed programmatically.

38. The method of claim 35 wherein the routing of the two communications occurs during the overlapping time range.

* * * * *

UNITED STATES PATENT AND TRADEMARK OFFICE
CERTIFICATE OF CORRECTION

| | | |
|---|---|---|
| PATENT NO. | : 8,503,663 B2 | Page 1 of 1 |
| APPLICATION NO. | : 11/427972 | |
| DATED | : August 6, 2013 | |
| INVENTOR(S) | : Mewhinney et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1185 days.

Signed and Sealed this
Twenty-seventh Day of January, 2015

Michelle K. Lee
*Deputy Director of the United States Patent and Trademark Office*